Oct. 30, 1951 W. T. MORRIS 2,573,044
CONTROL MECHANISM

Filed Aug. 25, 1947 4 Sheets-Sheet 1

INVENTOR.
William Tudor Morris
BY
Wood, Arey, Herron & Evans
ATTORNEYS

Oct. 30, 1951      W. T. MORRIS      2,573,044
CONTROL MECHANISM
Filed Aug. 25, 1947      4 Sheets-Sheet 2
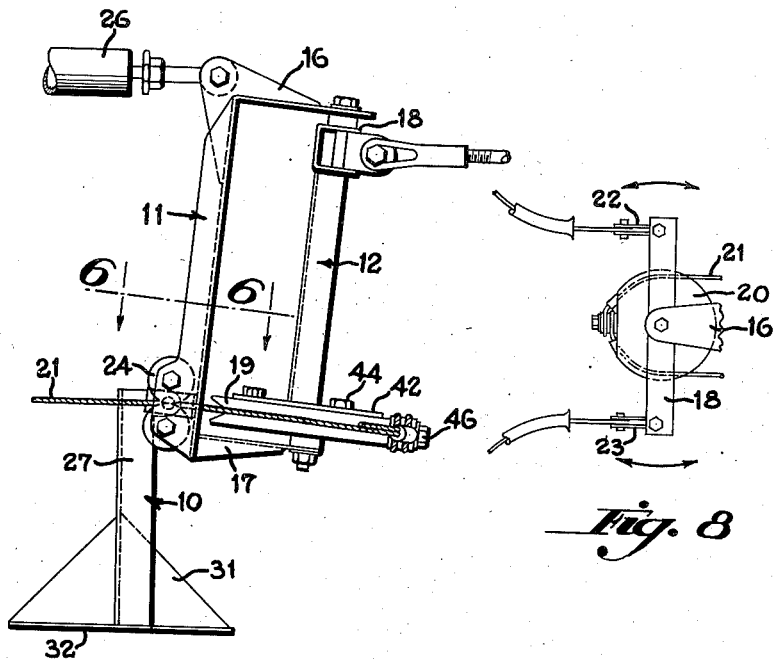
Fig. 5
Fig. 8
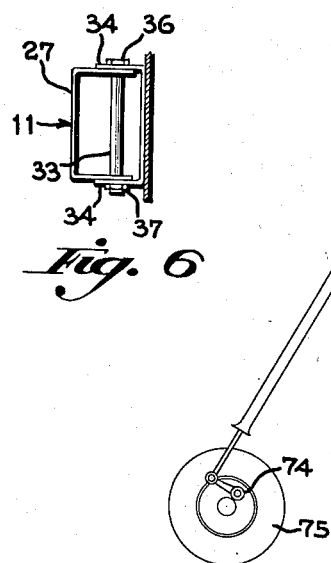
Fig. 6
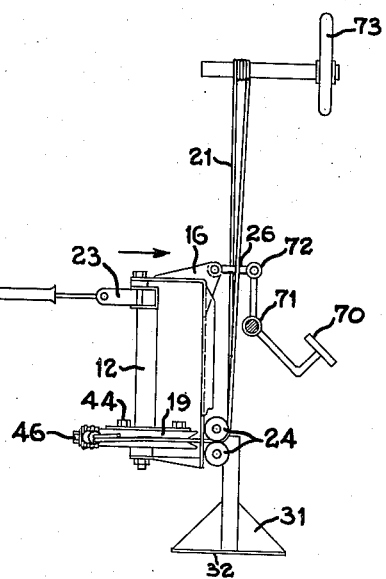
Fig. 7
INVENTOR.
William Tudor Morris
BY
ATTORNEYS

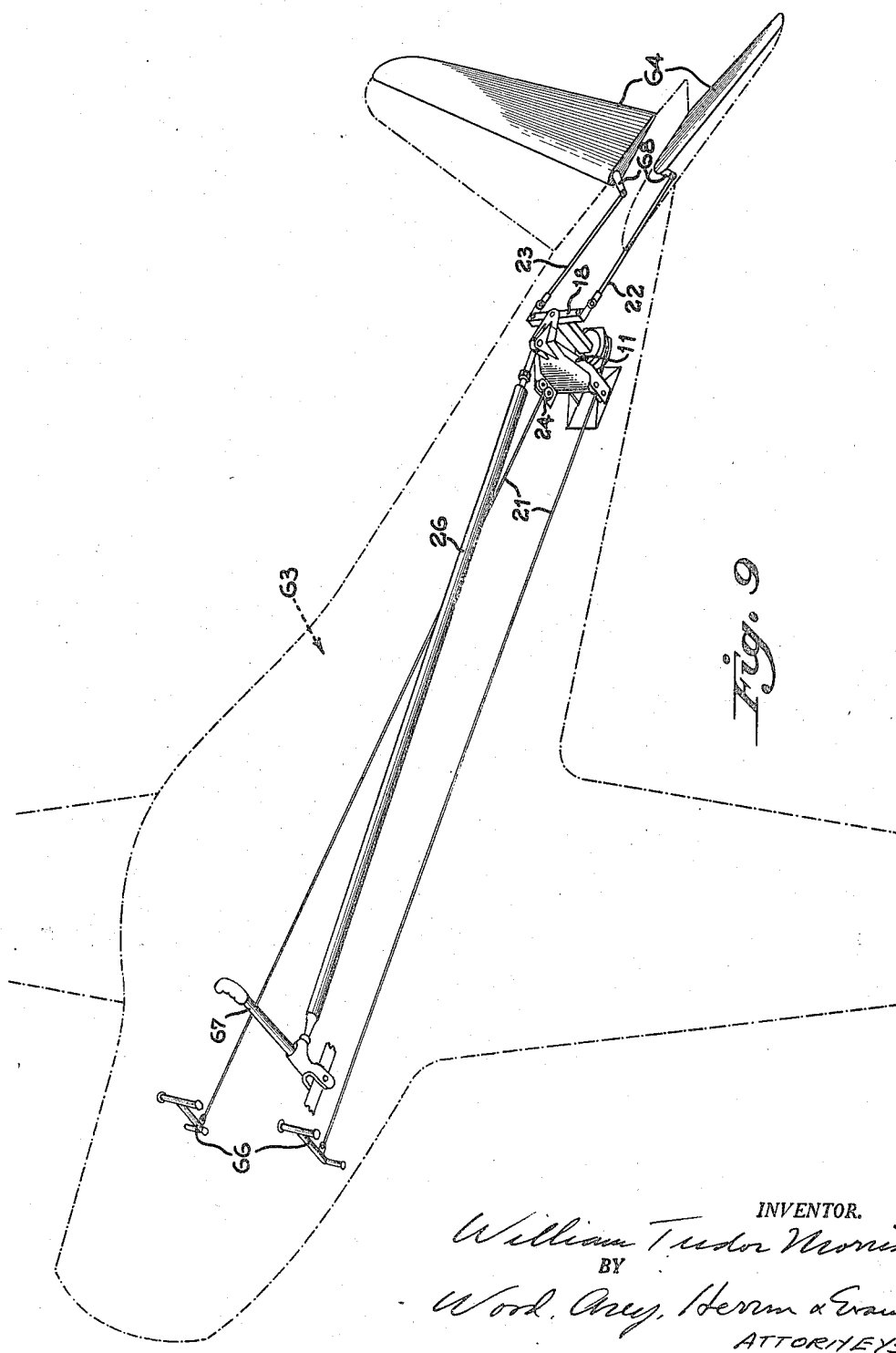

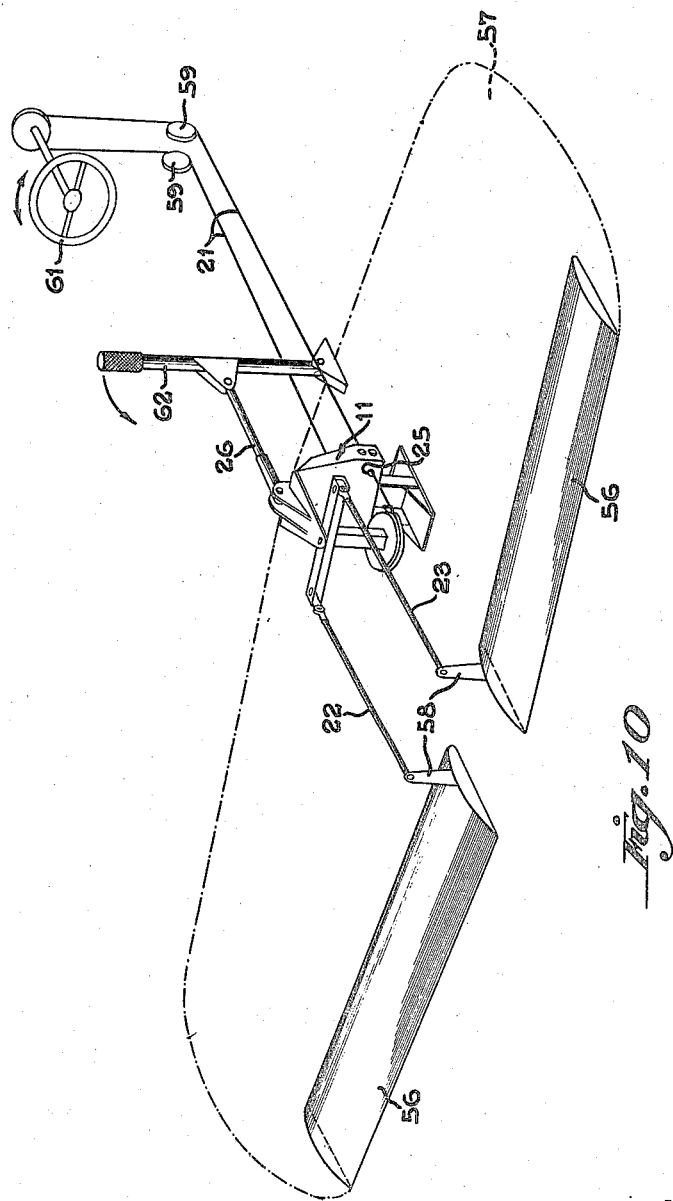

Patented Oct. 30, 1951

2,573,044

UNITED STATES PATENT OFFICE 2,573,044

CONTROL MECHANISM

William Tudor Morris, Middletown, Ohio, assignor to Aeronca Aircraft Corporation, Middletown, Ohio, a corporation of Ohio Application August 25, 1947, Serial No. 770,436

3 Claims. (Cl. 244—83)

This invention relates to a control mechanism and more particularly to a device for use on aircraft in order to operate a pair of controls both oppositely and in unison.

On certain types of aircraft, particularly small aircraft of the training type, it is preferable to use a single pair of controls for more than one purpose. Normally certain of the controls of an aircraft may be moved only in unison or oppositely. However, if the controls can be moved both in unison and oppositely, the same pair of controls can serve dual purposes. As an example of such controls, in many small aircraft the ailerons can be made to serve as flap or braking surfaces to control the speed of the plane as well as to give lateral control. Where it is desired to use the same surfaces as ailerons and flaps, it is necessary for the surfaces to be moved oppositely when employed as ailerons but in unison when employed as flaps.

Another example of surfaces which must be moved both in unison and oppositely are the control surfaces of a plane having a "butterfly" type tail in which two controllable tail surfaces are used. The surfaces are arranged to extend outwardly at an acute angle to the horizontal and appear as a V when viewed from the rear of the aircraft. With this arrangement, the surfaces are moved in unison when serving as conventional elevators for vertical control and are moved oppositely when serving as rudders for directional control.

It has been a principal objective of the present inventor to produce a control mechanism which is adapted to operate a pair of controls both oppositely and in unison.

A further objective of the inventor has been to develop a small, rugged, compact, easily constructed control mechanism which is adapted to operate aircraft controls oppositely and in unison and which can be mounted conveniently in small spaces aboard an aircraft.

It has been a further objective of the inventor to develop a control mechanism which is adapted to operate lateral control surfaces in unison to control air speed as well as oppositely for lateral control.

A still further objective of this inventor has been to provide a control mechanism adapted to operate both oppositely and in unison the tail controls of an aircraft having a "butterfly" type tail.

A still further object of this inventor has been to provide a control mechanism which will permit differential control of opposite wheel brakes of an aircraft which utilizes a single brake pedal for control of speed on the ground.

Briefly, the control mechanism of this invention in its preferred form includes an axle mounted for both rotation and swinging. The axle is rotatably mounted in a supporting bracket, which bracket in turn is supported for swinging upon an external base connected to an appropriate part of the main frame of the aircraft. At one end of the axle is located a wheel or other cross member to which are attached cables for controlling rotation of the axle. Swinging of the axle and bracket is controlled by a bar or other appropriate means attached to the bracket. A second cross member mounted at the opposite end of the axle carries control members for operating the aircraft controls. When the axle is rotated the control members are operated oppositely while when the axle is swung, the controls are operated in unison.

With the above and other features and objects in view, the invention will now be described more particularly with reference to the accompanying drawings which represent a preferred embodiment of the invention and in which:

Figure 5 is a side view showing the control mechanism after it has swung for operating the controls in unison.

Figure 6 is a fragmentary sectional view taken on line 6—6 of Figure 5.

Figure 7 is a schematic side view showing the control mechanism connected to actuate the braking system of an aircraft.

Figure 8 is a fragmentary schematic plan view of the control mechanism and braking apparatus illustrated in Figure 7.

Figure 9 is a schematic perspective view showing the control mechanism in place in an airplane for controlling the movement of the tail surfaces of an aircraft having a "butterfly" type tail.

Figure 10 is a schematic perspective view showing the control mechanism attached to operate lateral control surfaces which serve as air-braking or flap surfaces in addition to serving as ailerons.

Figure 1:
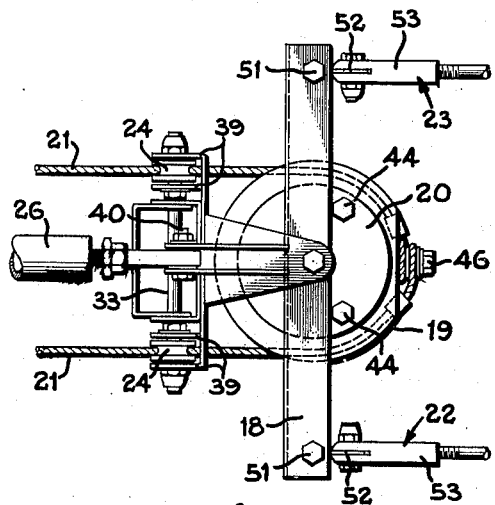
Figure 1 is a plan view of a control mechanism constructed in accordance with this invention.

As illustrated in Figures 1 to 5 inclusive the control mechanism includes a base 10 upon which a bracket 11 is supported for swinging. The bracket 11 is of C-shape in side view and an axle 12 is carried in bearings 13 and 14 in arms 16 and 17 of the C-shaped bracket 11. A cross member 18 is rigidly attached to the upper end of the axle 12 and rotates with it. A lower element 20 of circular plate form has a grooved sector 19 secured thereto. Cables 21 are attached to the sector 19 and operate in the groove of the sector. Pull on either cable will cause rotation of the axle 12 since the sector is mounted in concentric relationship to the axle.

The upper cross member 18 extends diametrically relative to the axle 12. Control rods 22 and 23 are attached to the ends of the upper cross member 18 and are actuated by the mechanism.

The cables 21 pass through the axis about which the bracket 11 swings with relation to the base 10. Four guide pulleys 24 rotatably mounted on the bracket 11 maintain the cables 21 in position. The cables 21 pass through openings 25 (Figure 10) drilled through the bracket 11. An operating rod 26 is attached to the bracket 11 at the end thereof away from the base 10 and swings the bracket with reference to the base 10 while the control cables 21 operate the mechanism for rotation of the axle 12. When the bracket 11 is swung by means of the control rod 26, the control members 22 and 23 operate in unison; while, when the axle 12 is swung by means of the cables 21, the control members 22 and 23 are operated in opposite directions.

The control mechanism which has been described generally above will now be described in greater detail.

Figure 3:
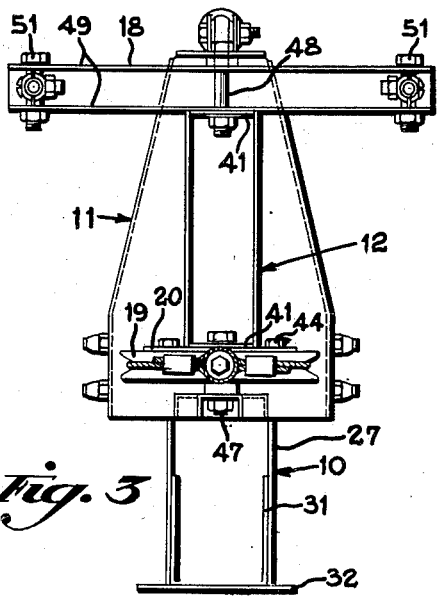
Figure 3 is an end view of the control mechanism.

The base 10 is formed, as shown in Figure 3, from a length of channel iron 27 disposed in upright position. The channel 27 is supported by gusset plates 31 attached to either side thereof. The gusset plates 31 in turn are mounted on a base plate 32, which may be attached in any appropriate manner to the structure of an aircraft.

A cross rod 33 (Figure 6) passes through opposite edges of the upper part of the channel 37 and operates as a pivot rod about which the bracket 11 swings. A pair of flanges 34 on the C-shaped bracket 11 are traversed by the cross rod 33 and support the bracket 11 (Figure 6). The cross rod 33, channel 29, and bracket 11 are maintained in assembled relation by a bolt head 36 and nut 37 at opposite ends of the cross rod 33.

Figure 2:
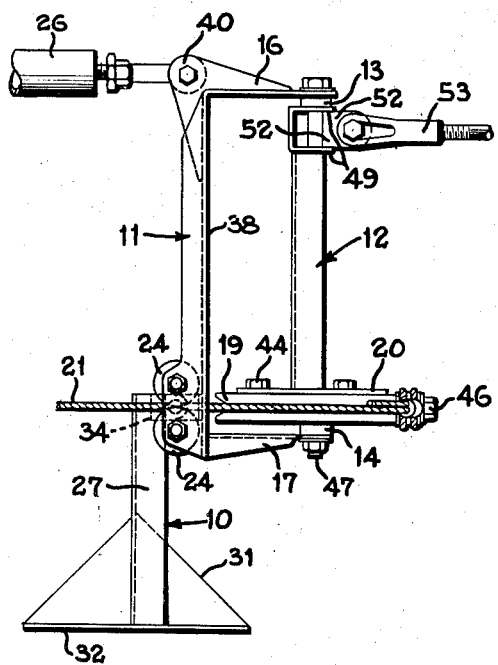
Figure 2 is a side view of the control mechanism.

As shown in Figure 2, the flanges 34 on the C-shaped bracket 11 which support it are located adjacent one end of the base or vertical side 38 of the C-shaped bracket 11. The guide pulleys 24, as shown in Figures 1 and 2, are positioned adjacent the ends of the cross rod 33. The guide pulleys 24 are carried between spaced flanges 39 of the bracket 11. Thus the bearing wheels 24 are arranged in pairs, the elements of which are vertically spaced, to guide the control cables 21 through the axis about which the bracket 11 swings.

The control rod 26 is attached to the C-shaped bracket 11 by means of a pivot pin 40 at the end of the vertical side 38 thereof opposite to that which is mounted on the base. Thus the control rod 26 operates to swing the bracket 11 about the cross rod 33.

The axle member 12, as shown in Figure 3, is constructed from a channel having flanges 41 bent over to close the open ends of the channel.

Figure 4:
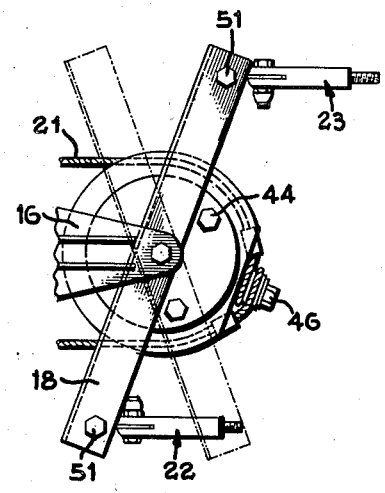
Figure 4 is a fragmentary plan view showing the control mechanism in varying positions of rotation.

The flanges 41 are fixed to the cross member 18 and the lower element 20. The lower member 20, as stated, is a circular plate which is firmly attached to the lower flange 41 by welding or other appropriate means. The sector pulley element 19 is bolted to the circular member 20 by means of bolts 44. As shown in Figures 1 and 4 one side of the sector pulley 19 is flattened to receive a stud 46 to which are attached the ends of the cables 21. A pivot bolt 47, which passes through the circular plate 20, the sector pulley 19, the lower flange 41, and the lower arm 17 of the bracket 11, rotatably supports the lower end of the axle 12. The upper end of the axle is rotatably supported by a pivot bolt 48 which passes through the upper arm 16, the upper cross member 18, and the upper flange 41.

The upper cross member 18 is formed from a channel facing outwardly, and the bolt 48 passes through openings drilled in the flanges 49 of the cross member 18. Adjacent the ends of the cross member 18 further apertures are drilled through flanges 49 to receive bolts 51. The bolts 51 serve as pivots to support the control members 22 and 23. The head of each of the control members 22 and 23 includes a strap 52 which is rotatably mounted on the bolts 51 to swing in a horizontal plane. Attached to each strap 52 and rotatably supported thereon is a bifurcated link 53 mounted to swing in a vertical plane. The links 53 are threaded in the ends of the control rods 22 and 23.

The control mechanism is constructed to operate the control rods 22 and 23 oppositely in response to operation of the cables 21 and in unison in response to operation of the control rod 26. In Figures 7 through 10 inclusive are illustrated schematically examples of applications for the control mechanism of this invention.

In Figure 10 the control mechanism is shown in association with the lateral control surfaces 56 of an aircraft to permit the surfaces 56 to be operated in unison to act to control the speed of the aircraft as well as oppositely to control its lateral movement.

The wing of an aircraft is shown schematically at 57. The lateral control surfaces 56 are located in a conventional manner along the trailing edge of the wing 57. Control rods 22 and 23 are connected to arms 58 attached to the control surfaces 56. The cables 21 are connected by way of appropriate pulleys 59 to a control wheel 61 which controls the lateral movement of the aircraft.

The control rod 26 is attached to a stick 62, which controls the surfaces 56 for movement in unison for control of the speed of the aircraft. When the stick 62 is moved backwardly, as indicated by the arrow, the surfaces 56 are lowered to act as air brakes. On the other hand, when the wheel 61 is turned the surfaces 56 move oppositely to control lateral movement of the aircraft. Thus, the single pair of control surfaces 56 is operated simply and conveniently by means of the control mechanism to control both the lateral movement and the speed of the aircraft.

In Figure 9 the control mechanism is shown associated with a V-type or "butterfly" tail. The body of an aircraft is shown schematically at 63. Adjacent the tail thereof is mounted a pair of control surfaces 64, which surfaces 64 are mounted to meet at an angle with the horizontal and to have the appearance of a V as viewed from the rear of the aircraft. The control cables 21 are connected to conventional rudder pedals 66, and the control rod 26 is attached to a stick 67. The control rods 22 and 23 are linked to the control surfaces 64 by means of arms 68. When the stick 67 is moved to the rear, the surfaces 64 are raised in unison to elevate the aircraft; while, when the stick 67 is pushed forward, the surfaces 64 are depressed to point the aircraft lower. Operation of the rudder pedals 66 operates the control members 22 and 23 oppositely to give opposite action of the surfaces 64. Thus when one of the rudder pedals 66 is pushed the surfaces 64 are actuated in opposite directions to steer the aircraft into a turn.

In Figures 7 and 8 the control mechanism is shown associated with the braking mechanism of an aircraft. The aircraft is equipped with a single rudder pedal 70 which operates brakes on both wheels. The brake pedal 70 is pivoted on a rod 71 and is linked to the control rod 26 by means of a pivot 72. The control cables 21 are connected to a control wheel 73, and the control members 22 and 23 are linked to brakes 74 on aircraft wheels 75. When the wheel 73 is turned to the right or to the left and the brake pedal 70 is actuated a differential braking pressure is applied to the wheels of the aircraft to steer it. Thus, when the single brake pedal is depressed, a greater pressure is applied to one brake than the other to steer the aircraft on the ground. The wheel 73 may be linked to the ailerons of the aircraft so that the aircraft is steered on the ground with the control which steers it in the air.

The control mechanism of this invention is compact in form and can be located in close proximity to the controls to be operated by it. It effectively operates a single pair of controls both in unison and oppositely so that the pair of controls can serve more than a single function.

The examples of the present invention which have been given are intended only to illustrate specific use of the control mechanism, and the invention is not intended to be limited by the examples except as pointed out in the appended claims.

Having described my invention, I claim:

1. A control mechanism comprising; a supporting base structure, a bracket pivotally mounted on said base structure for rocking movement, a shaft rotatably journalled in said bracket, said shaft being generally vertically disposed relative to the base structure, the upper end of said shaft having a cross member fixed thereto, the lower end of said shaft having a sector pulley fixed thereto, cable means disposed around said sector pulley and including runs passing laterally through the axis of the pivotal mounting for the bracket, pairs of guide pulleys mounted on the bracket, the elements of the pairs engaging the runs disposed on opposite sides of the shaft and in line with the axis of the pivotal mounting for the bracket, a pair of control elements secured to the respective ends of said upper cross member, and operating means attached to the upper end of the bracket for actuating the bracket for rocking motion whereby pulling action on the respective cable runs causes movement of the control elements in opposite directions and movement of the operating means at the upper end of the bracket causes movement of the control elements simultaneously in the same direction.

2. A control mechanism comprising; a base, a C-shaped bracket mounted for swinging movement upon said base, an axle mounted for rotation between the arms of said C-shaped bracket, a pair of members rigidly mounted on the ends of said axle, a pair of control cables attached to one of said members to control the rotation of said axle. said cables passing substantially through the axis about which said bracket and axle swing, four cable guide pulleys mounted on said bracket, said pulleys being mounted in pairs on opposite sides of the axis of swinging movement of said bracket and axle to maintain said cables passing through said axis, a pair of control members attached at the opposite ends of the second member, means for operating said cables to rotate said axle, and means for swinging said bracket and axle, whereby said control members are operated in unison when said axle is swung and operated oppositely when said axle is rotated.

3. A control mechanism comprising; a base, a C-shaped bracket having a pair of arms and a connecting member joining said arms, said bracket pivotally mounted upon the base for swinging movement about an axis which extends laterally of the bracket adjacent the juncture of one of the arms and the connecting member, a shaft rotatably mounted between the arms of the bracket, a cross member rigidly attached to said shaft near the end thereof which is remote from said axis of swinging movement of the bracket, a sector pulley affixed to the shaft near the end opposite the cross member, a pair of control cables attached to said sector pulley for controlling the rotation of said shaft, means at opposite sides of said C-shaped bracket adapted to guide the cables through the axis of swinging movement of the bracket whereby the tension of the cables is unaffected by said swinging movement, a pair of control members attached at opposite ends of the cross member, means for operating said cables to rotate said shaft and cross member, and means for swinging said bracket and shaft, whereby said control members are operated in unison when said shaft is swung and operated oppositely when said shaft is rotated.

WILLIAM TUDOR MORRIS.

REFERENCES CITED

The following references are of record in the file of this patent:

UNITED STATES PATENTS

| Number | Name | Date |
|---|---|---|
| 2,355,026 | Koppen | Aug. 1, 1944 |

FOREIGN PATENTS

| Number | Country | Date |
|---|---|---|
| 484,693 | Great Britain | Pub. 1938 |
| 852,599 | France | Oct. 30, 1939 |